United States Patent
Hu et al.

(10) Patent No.: US 10,112,102 B2
(45) Date of Patent: Oct. 30, 2018

(54) SYSTEM FOR ENERGY ON-SITE COLLECTION AND MEASUREMENT FEEDBACK

(75) Inventors: Xiao Hu, Guangdong (CN); Jin Hu, Guangdong (CN)

(73) Assignee: Xiao Hu, Shenzhen, Guangdong (CN)

( * ) Notice: Subject to any disclaimer, the term of this patent is extended or adjusted under 35 U.S.C. 154(b) by 383 days.

(21) Appl. No.: 13/503,897

(22) PCT Filed: Oct. 22, 2010

(86) PCT No.: PCT/CN2010/078018
§ 371 (c)(1),
(2), (4) Date: Apr. 25, 2012

(87) PCT Pub. No.: WO2011/050696
PCT Pub. Date: May 5, 2011

(65) Prior Publication Data
US 2012/0208675 A1    Aug. 16, 2012

(30) Foreign Application Priority Data
Oct. 29, 2009 (CN) .......................... 2009 1 0110396

(51) Int. Cl.
| | |
|---|---|
| *G06Q 30/00* | (2012.01) |
| *A63B 71/06* | (2006.01) |
| *G06Q 30/02* | (2012.01) |
| *A63B 21/005* | (2006.01) |
| *A63B 22/02* | (2006.01) |

(Continued)

(52) U.S. Cl.
CPC ...... *A63B 71/0622* (2013.01); *A63B 21/0054* (2015.10); *G06Q 30/0226* (2013.01); *A63B 22/02* (2013.01); *A63B 22/0605* (2013.01); *A63B 2225/15* (2013.01); *H02J 7/32* (2013.01)

(58) Field of Classification Search
None
See application file for complete search history.

(56) References Cited

U.S. PATENT DOCUMENTS 5,906,581 A * 5/1999 Tsuda .......................... 600/485
6,217,398 B1 * 4/2001 Davis .......................... 440/21
(Continued)

FOREIGN PATENT DOCUMENTS

JP     2005275919     * 10/2005

*Primary Examiner* — Michael W Schmucker
(74) *Attorney, Agent, or Firm* — Jackson IPG PLLC; Demian K. Jackson

(57) ABSTRACT

The invention relates to a system for energy on-site collection and measurement feedback, which comprises fitness apparatuses capable of producing mechanical energy, generators, power meters and energy storage accumulators, wherein the fitness apparatuses are provided with moving parts for exercise which are connected with the generators and drive the generators to generate power; the generators are connected with the accumulators through the power meters for measuring the generating capacity; and each power meter comprises a bank card reader which has function of reading and updating data. The power meters can count and display energy produced by the excise of each person each time and a data processing host can summarize energy values produced by different apparatuses on the same site, so that exercisers are promoted to increase interest in exercise and take exercise regularly.

4 Claims, 7 Drawing Sheets

(51) Int. Cl.
    *A63B 22/06*     (2006.01)
    *H02J 7/32*     (2006.01)

(56) References Cited

U.S. PATENT DOCUMENTS

| | | | | |
|---|---|---|---|---|
| 6,446,745 | B1* | 9/2002 | Lee et al. | 180/206.2 |
| 2003/0154163 | A1* | 8/2003 | Phillips | G06Q 20/10 |
| | | | | 705/39 |
| 2009/0247366 | A1* | 10/2009 | Frumer | 482/2 |
| 2010/0013322 | A1* | 1/2010 | Sogabe | H04B 5/0093 |
| | | | | 307/104 |

* cited by examiner

SYSTEM FOR ENERGY ON-SITE COLLECTION AND MEASUREMENT FEEDBACK

FIELD OF THE INVENTION

The technical proposal of the invention relates to a system capable of producing and measuring electric energy, in particular to a system for power generation and accumulated measurement and capital feedback of fitness apparatuses.

BACKGROUND OF THE INVENTION

With the development of the times, the rhythm of life of people is faster and faster. People must have good physical quality in order to be adapted to modern life and also deeply understand the importance of scientific body-building. In recent years, many subdistricts are provided with outdoor fitness apparatuses in order to meet people's body-building demands. And the application scope of the outdoor fitness apparatuses is more extensive. While the outdoor fitness apparatuses play a good role in body-building, most commonly used ones available only have the function of body building but waste the chemical energy consumed by people during the exercise. Some fitness apparatuses are also connected with power generation devices, but the electric energy produced is difficult to accumulate apart from being consumed in time, and in particular, the benefits cannot be fed back to exercisers.

SUMMARY OF THE INVENTION

The invention provides a system for energy on-site collection and measurement feedback with scale effect, capable of collecting chemical energy consumed by people during the exercise, converting the chemical energy into available energy, and performing benefit feedback simultaneously.

The technical proposal adopted by the invention to solve the traditional technical problem is that: the invention relates to a system for energy on-site collection and measurement feedback, which comprises fitness apparatuses capable of producing mechanical energy, generators, power meters and energy storage accumulators, wherein the fitness apparatuses are provided with moving parts for exercise which are connected with the generators and drive the generators to generate power; the generators are connected with the accumulators through the power meters for measuring the generating capacity; and each power meter comprises a bank card reader which has function of reading and updating data. The preferred technical proposal of the invention is that: the system also comprises a data processing host; data of the power meters are transmitted to the data processing host for summarization by wireless or wired means; and bank card readers for the power meters are two-step bank card readers for registration first and read/write later.

The preferred technical proposal of the invention is that: the system comprises a keyboard which is connected with the data processing host; and the interval between registration and read/write of the bank card readers is at least 5 minutes.

The preferred technical proposal of the invention is that: the data processing host is connected with the power meters of all the fitness apparatuses on an exercise site.

The preferred technical proposal of the invention is that: the system comprises light-emitting devices which are connected with the accumulators; and the operating state of each light-emitting device is controlled by a switch.

The preferred technical proposal of the invention is that: the fitness apparatuses include shoulder rehabilitation trainers, double-seat arm wheels, single-column double-seat rotating wheels, single-column riding machines, double-seat surfboard trainers, treadmills and exercycles.

The preferred technical proposal of the invention is that: the generators are DC generators or AC generators.

The preferred technical proposal of the invention is that: the power meters are provided with display screens for data display.

The preferred technical proposal of the invention is that: the accumulators are changeable accumulators and are provided with alarm systems for full-power alarm.

The preferred technical proposal of the invention is that: the data processing host can be used for changing the password and inquiring about the power storage capacity of a specified user and corresponding currency amount thereof.

The system is provided with switch-controlled light-emitting devices such as miniature bulbs, so that the miniature bulbs can be directly switched on during the nighttime exercise, thus providing convenience for exercisers.

The power meters are provided with the display screens for data display. The total electric quantity, namely the total electric energy produced by the exercise of the exercisers, recorded in the bank cards held by the exercisers can be directly read via the display screens. If the system is arranged inside a subdistrict, some incentive methods can be set in certain cases. For example, the accumulated electric quantity can be used to get corresponding small gifts in return.

The accumulators are changeable accumulators and are provided with the alarm systems for full-power alarm. When the accumulators are charged with full power, the alarm systems can remind of the timely replacement of the full-power accumulators by a bell and the like.

The data processing host and the keyboard can be used for changing the password and inquiring about the electric storage capacity of the specified user and the corresponding currency amount thereof, thus providing convenience for user management.

The invention also provides an on-site collection and measurement feedback method, which is used for converting mechanical energy into electric energy and converting the converted electric energy into the currency amount of energy for storage. The method comprises the following steps of: inserting bank cards into the power meters; allowing the electric quantity and the currency amount of electric energy in the bank cards to be read by the power meters and displayed on the display screens; allowing the data processing host to begin data statistics; allowing the users to begin taking exercise; converting chemical energy generated by the exercise of the users into electric energy by the generators; converting the electric quantity into the currency amount of electric energy by the data processing host, and charging the currency amount of electric energy into the bank cards of the users; and determining whether the light-emitting device on the site is in full-power state, wherein if not, the light-emitting devices on the site are charged; and if so, the accumulators are charged.

The invention has the advantages that: compared with the prior art, the system for energy on-site collection and measurement feedback provided by the invention can be used for collecting the chemical energy consumed by people during the exercise, converting the mechanical energy into the available electric energy by the generators, and storing the electric energy by the accumulators. Moreover, the power meters can count and display the energy produced by the exercise of each person each time and the data processing host can summarize, display and feed back energy values produced by different apparatuses on the same site, so that the exercisers are promoted to increase interest in exercise and take exercise regularly.

DETAILED DESCRIPTION OF THE PREFERRED EMBODIMENTS

Figure 1:
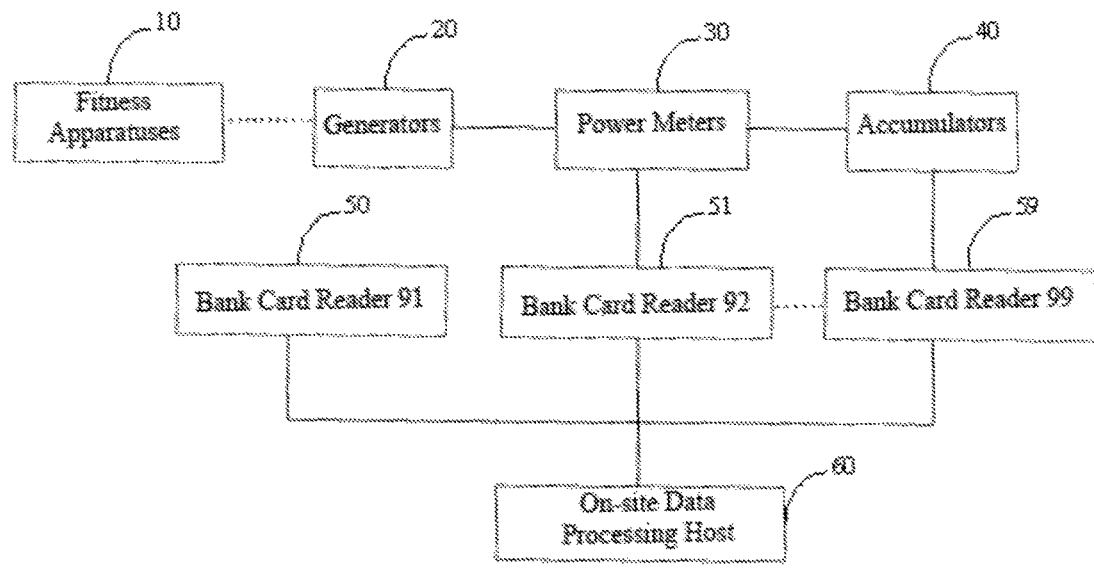
FIG. 1 is an overall structure diagram of the invention.
Figure 2:
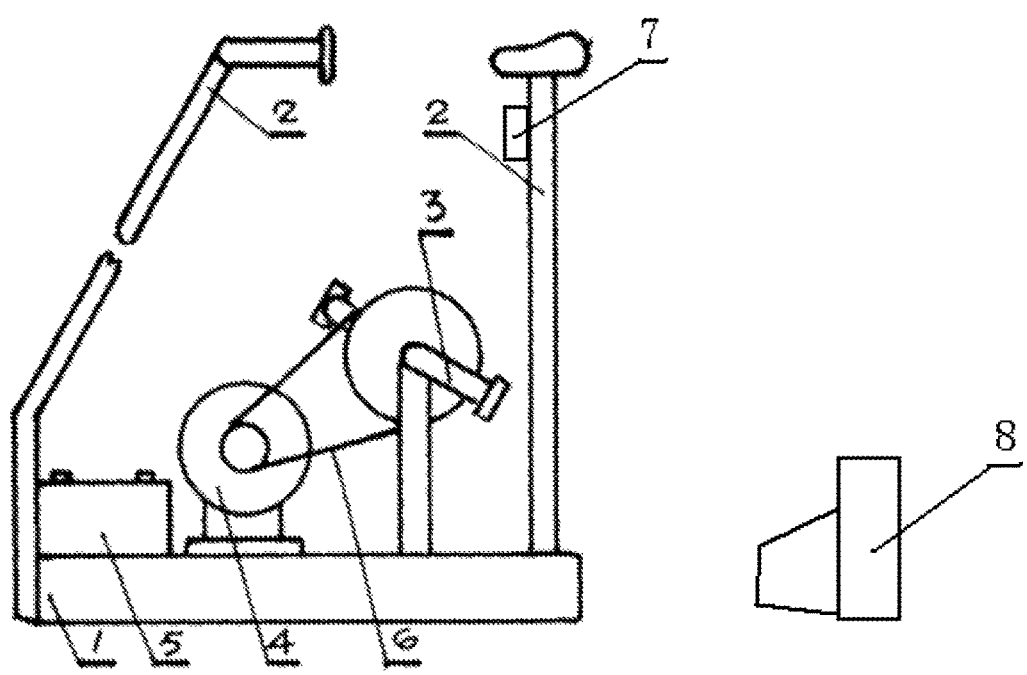
FIG. 2 is a structure diagram of a system for energy on-site collection and measurement feedback with foot pedal trainers as dominant fitness apparatuses.
Figure 3:
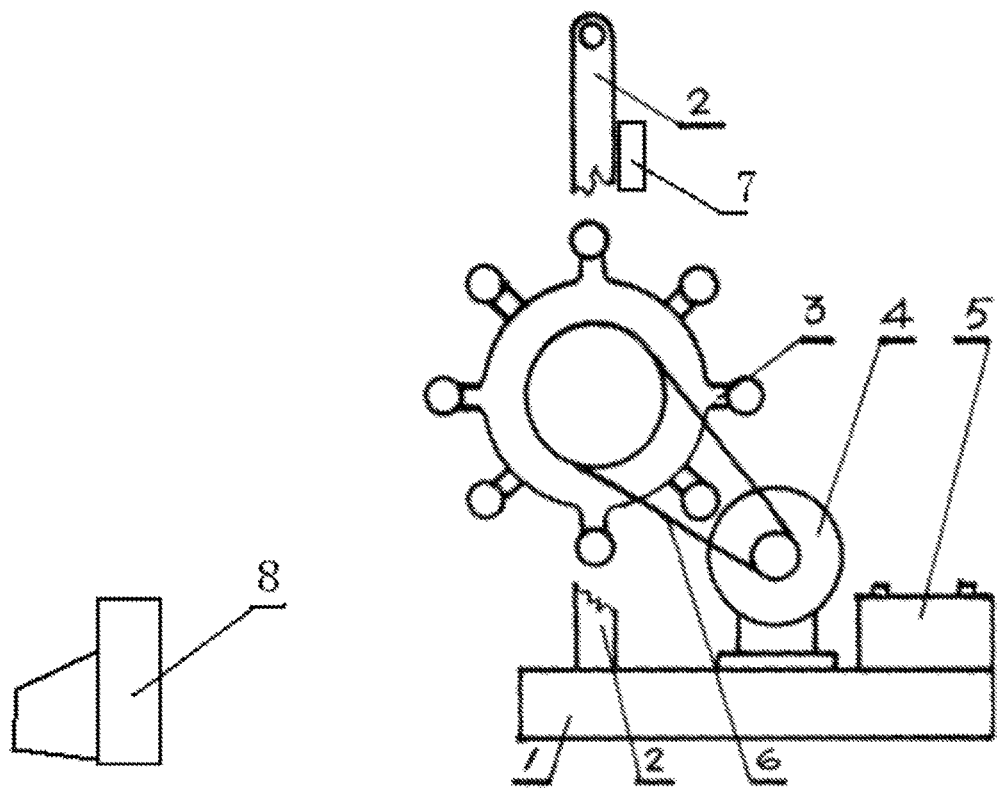
FIG. 3 is a structure diagram of a system for energy on-site collection and measurement feedback with foot pedal trainers and arm rotation trainers as dominant fitness apparatuses.
Figure 4:
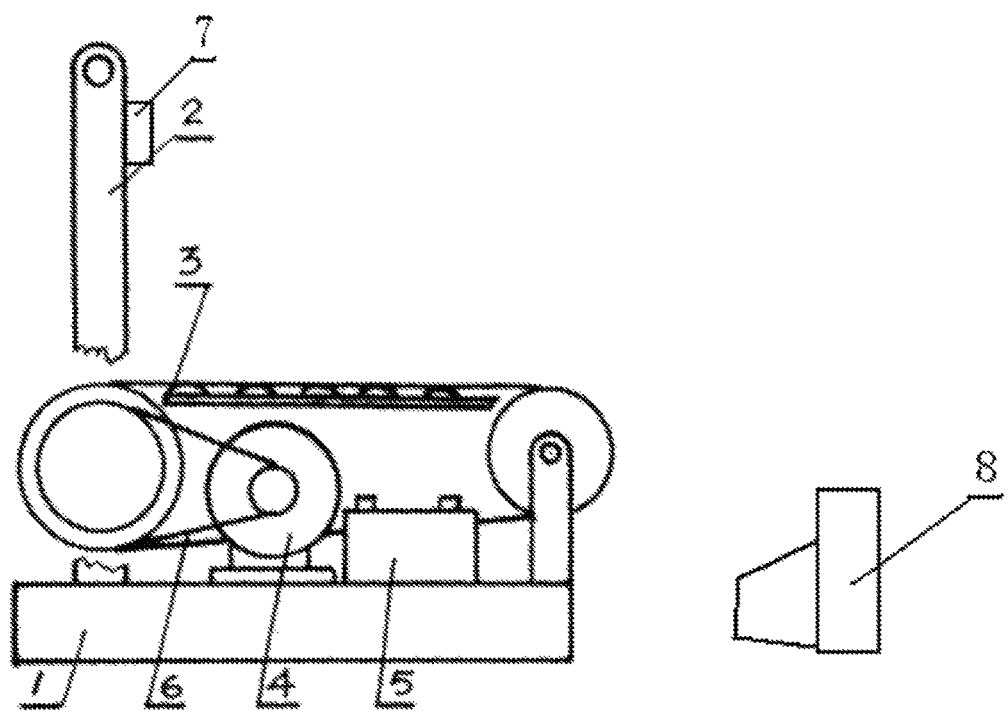
FIG. 4 is a structure diagram of a system for energy on-site collection and measurement feedback with treadmills as dominant fitness apparatuses.
Figure 5:
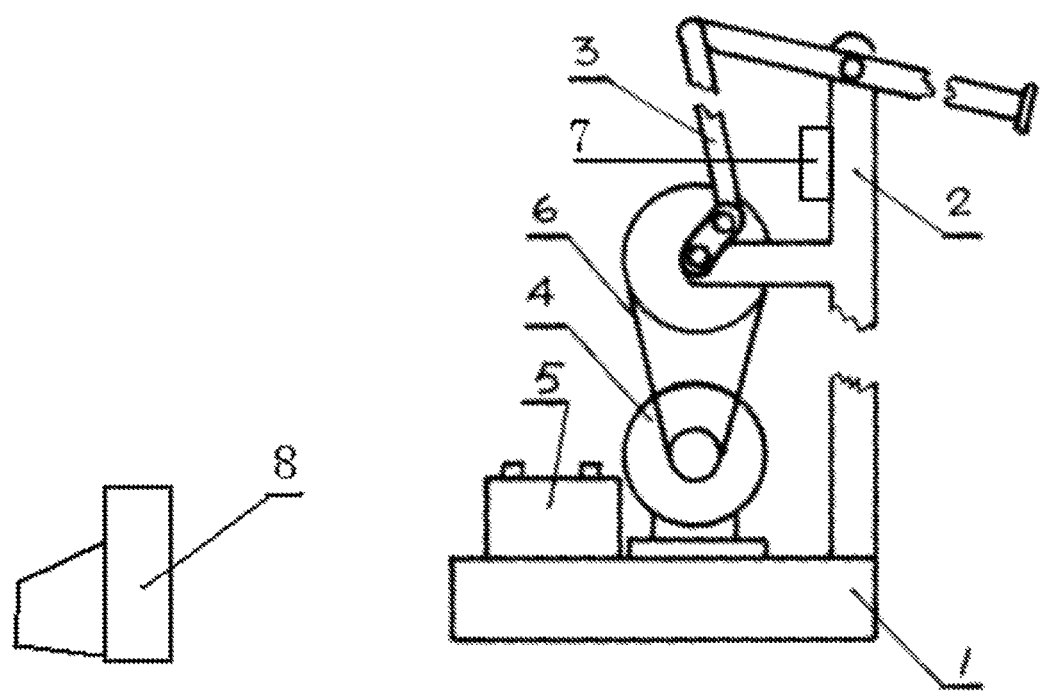
FIG. 5 is a structure diagram of a system for energy on-site collection and measurement feedback with pullover trainers as dominant fitness apparatuses.

Further description is given to the technical proposal of the invention with the attached embodiments:

The invention relates to a system for energy on-site collection and measurement feedback, which comprises fitness apparatuses 10, generators 20, power meters 30, accumulators 40, a data processing host 60, a keyboard and light-emitting devices (such as miniature bulbs), wherein the fitness apparatuses 10 are provided with moving parts for exercise and can be shoulder rehabilitation trainers, double-seat arm wheels, single-column double-seat rotating wheels, single-column riding machines, double-seat surfboard trainers, treadmills and exercycles but are not limited to the exemplified fitness apparatuses 10.

The moving parts for exercise of the fitness apparatuses are connected with the generators 20 and drive the generators 20 to generate power (the generators 20 are DC generators 20 or AC generators 20); the generators 20 are connected with the accumulators 40; and the accumulators 40 are changeable accumulators 40 and are provided with alarm systems for full-power alarm.

The power meters 30 for measuring the generating capacity are connected between the generators 20 and the accumulators 40; each power meter 30 comprises a bank card reader which has the function of reading and updating data; the bank card readers of the power meters 30 are two-step or interval type bank card readers for registration first and read/write later; and the interval between registration and read/write of the bank card readers is at least 5 minutes. That is to say, during the exercise, the bank cards for ID identification are used for reading/writing first; the measurement begins; and the bank cards are used for reading/writing again after the exercise, wherein the total energy produced by the exercise or the converted currency amount thereof can be stored into the cards and accumulated. If the exercise time is less than 5 minutes, the measurement this time will be zero; and if the read/write operation of the cards for the second time is forgotten after the exercise, the measurement this time will be ignored.

The power meters 30 are provided with display screens for data display; data of the power meters 30 are transmitted to the data processing host 60 for summarization by wireless or wired means; the data processing host 60 is connected with the power meters 30 of all the fitness apparatuses on a certain exercise site; and the keyboard is connected with the data processing host 60 which can be used for changing the password and inquiring about the power storage capacity of a specified user.

The light-emitting devices are connected with the accumulators 40 and controlled by switches.

The structure and the operating principle of the generators 20 are as follows:

Each generator 20 generally comprises a stator, a rotor, an end cover and a bearing.

The stator consists of a stator core, a coil winding, a stator frame and other members for fixing the parts.

The rotor comprises a rotor core (or a magnetic pole or a yoke), a winding, a retaining ring, a center ring, a slip ring, a fan and a rotating shaft.

The stator and the rotor of the generator 20 are connected and assembled through the bearing and the end cover, so that the rotor can rotate in the stator and perform magnetic line cutting movement, thus the inductive electromotive force is generated and led out via a connection terminal and connected into a circuit, consequently the current is generated.

The operating principle of the power meter is as follows:

When the power meter is connected into a circuit under test, an alternating current flows across a current coil and a voltage coil respectively; an alternating magnetic flux is generated by the two alternating currents respectively in cores of the current coil and the voltage coil; the alternating magnetic fluxes pass through an aluminum disc; and an eddy current is induced in the aluminum disc and acted upon by a force in a magnetic field, so that the aluminum disc obtains a torque (active moment) and rotates. The larger the power consumption of a load, the larger the current of the current coil; the larger the eddy current induced in the aluminum disc; and the larger the torque of the aluminum disc. That is to say, the torque is in direct proportion to the power consumption of the load. The larger the power, the larger the torque; and the faster the rotation speed of the aluminum disc. While rotating, the aluminum disc is acted upon by a braking moment generated by a permanent magnet, and the braking moment is opposite to the active torque in direction. The braking moment is in direct proportion to the rotation speed of the aluminum disc. The faster the rotation speed of the aluminum disc, the larger the braking moment. When the active moment and the braking moment achieve temporary equilibrium, the aluminum disc will be subjected to uniform rotation. The electric energy consumed by the load is in direct proportion to the revolution number of the aluminum disc. When the aluminum disc rotates, a counter is driven to indicate the electric energy consumed. The above is the simple working process of the power meter.

It shall be noted when using the power meter that: the power meter can be directly connected into the circuit for measurement in the case of low voltage (not more than 500 volts) and low current (several amperes), and cannot be directly connected into the circuit and must be matched with a voltage transformer or a current transformer in the case of high voltage or high current. As for the power meter which is directly connected into the circuit, a power meter with appropriate specification must be selected based on the voltage and the current of the load, so that the rated voltage or the rated current of the power meter is equal to or slightly more than the voltage or the current of the load. In addition, the power consumption of the load must be more than 10% of the rated value of the power meter, or the measurement will not be accurate and even the aluminum disc cannot be driven to rotate sometimes. Therefore, the power meters selected cannot be too large and cannot be too small as small power meters are easy to be burn out.

Accumulators 40:

Accumulators are one type of batteries and have the function of storing limited electric energy which is then applied at appropriate places. The working principle of the accumulators is to convert chemical energy into electric energy.

The accumulators take lead plates filled with spongy lead as cathodes, lead plates filled with lead dioxide as anodes, and 22-28% dilute sulfuric acid as electrolyte. The electric energy is converted into the chemical energy during the charge while the chemical energy is converted into the electric energy during the discharge. During the battery discharge, metallic lead is taken as the cathode, subjected to oxidation reaction and oxidized into lead sulfate while the lead dioxide is taken as the anode, subjected to reduction reaction and reduced into lead sulfate. When the batteries are charged by direct current, lead and lead dioxide are respectively generated at two poles. After a power source is removed, the batteries are restored to the state before discharge and combined into chemical batteries. Lead accumulators 40 are batteries capable of charging and discharging repeatedly and known as secondary batteries. The voltage of the lead accumulators 40 is 2V. In general, three lead accumulators 40 are connected with each other in series in use, and the voltage of the obtained product is 6V. A 12V battery pack formed by 6 lead accumulators 40 connected with each other in series is applied to motor vehicles. After the lead accumulators 40 are used for a period of time, distilled water must be replenished to maintain the electrolyte to contain 22-28% dilute sulfuric acid.

During the practical application, the typical working process of the system for energy on-site collection and measurement feedback is as follows:

An exerciser holding a card enters into an exercise center of a subdistrict and stands in front of a treadmill to prepare for taking exercise. A rotating shaft of the treadmill is connected with a power generation device of which output is connected with accumulators 40 for energy storage and meanwhile is connected to a bank card reader. The exerciser inserts the bank card with the functions of energy storage and measurement feedback into the bank card reader connected with the treadmill first, and the reader automatically performs logon and identification operations and waits for next instruction. After the exerciser begins running, the treadmill operates and the rotating shaft thereof drives a generator 20 connected therewith to generate power which is then used for charging the accumulators 40 immediately. The charged electric quantity is measured by a power meter and converted into the current currency, for example, RMB, at the interval of one time every minute, and the standby reader is notified to write the currency into the bank card of the exerciser. As for the traditional RMB amount in the bank card, the operation is accumulative.

When the operation is performed on a machine, in view of the factors of warming-up, trial operation and the like of the exerciser, the first read-in accumulative operation of the reader acted on a card logged on for the first time can only be performed after 5 minutes, so that misoperations are reduced and invalid operations are avoided. Therefore, in the case of numerous apparatuses in a fitness center of a subdistrict, the invalid operation number can be effectively reduced; the problem that centers at the level and higher level are busy to process summarization operation is avoided; and the phenomenon that halt and the like may not occur due to invalid data operation is guaranteed.

If the first exercise of one exerciser on a machine does not reach 5 minutes and the card is fetched, the record this time is regarded as invalid by the system, which is noted in an agreement for initializing the card and recognized by a card issuer and a card holder. After the first time, the operation of accumulating every minute and writing for one time is feasible, and the accumulative total of less than one minute at the last time is write into the card at one go when the card is fetched from the reader. In the case of rest during the exercise, the operation is at the interval of one minute as long as the card is not fetched.

Exercycles and the like among the fitness apparatuses adopt the mode of rotating at the same direction and adopt the same operations with the treadmill. Moreover, there is one type of fitness apparatuses performing reciprocating movement, for example, double-seat arm wheels. In order to achieve the effect of twisting the waist during the exercise, rotating wheels rotate towards two directions alternately. And an automatic phase inverter must be additionally arranged on the front of a generator which is connected with main shafts of the rotating wheels, so that a main shaft of the generator 20 always moves towards the same direction when the rotating wheels and the main shafts rotate towards different directions, thus the phenomenon that the kinetic energy may not be wasted due to backward movement is guaranteed.

Figure 6:
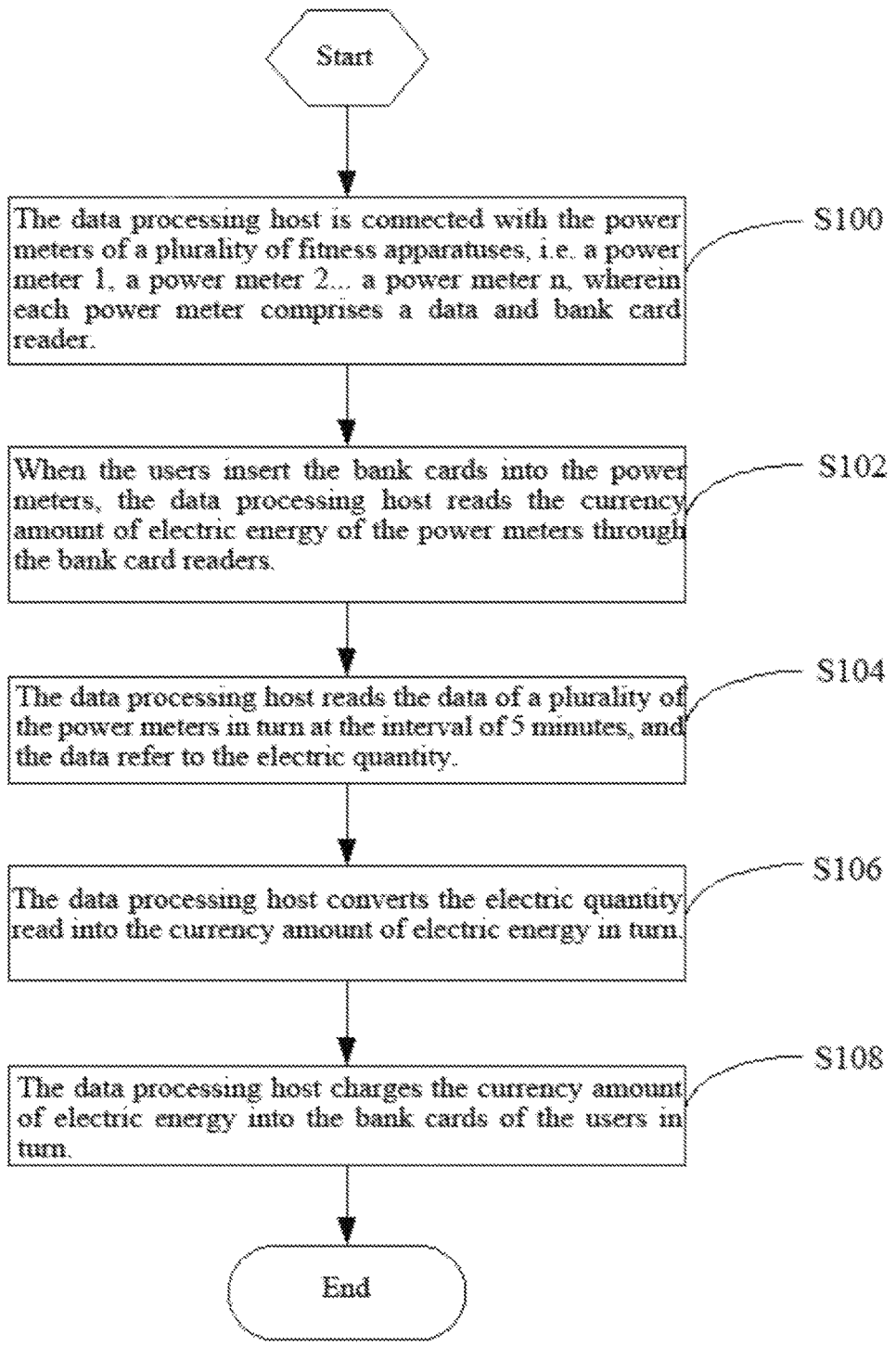
FIG. 6 is a workflow diagram of a data processing host of the invention.

As illustrated in FIG. 6 which is a workflow diagram of the data processing host 60 of the invention, in step S100, the data processing host 60 is connected with the power meters 30 of a plurality of the fitness apparatuses 10, i.e. a power meter 301, a power meter 302 . . . a power meter 30$n$, wherein each power meter 30 comprises a data and bank card reader.

In step S102, when the users insert the bank cards into the power meters 30, the data processing host 60 reads the currency amount of electric energy of the power meters 30 through the bank card readers.

In step S104, the data processing host 60 reads the data of a plurality of the power meters 30 in turn at the interval of 5 minutes, and the data refer to the electric quantity. In step S106, the data processing host 60 converts the electric quantity read into the currency amount of electric energy in turn.

In step S108, the data processing host 60 charges the currency amount of electric energy into the bank cards of the users in turn.

Figure 7:
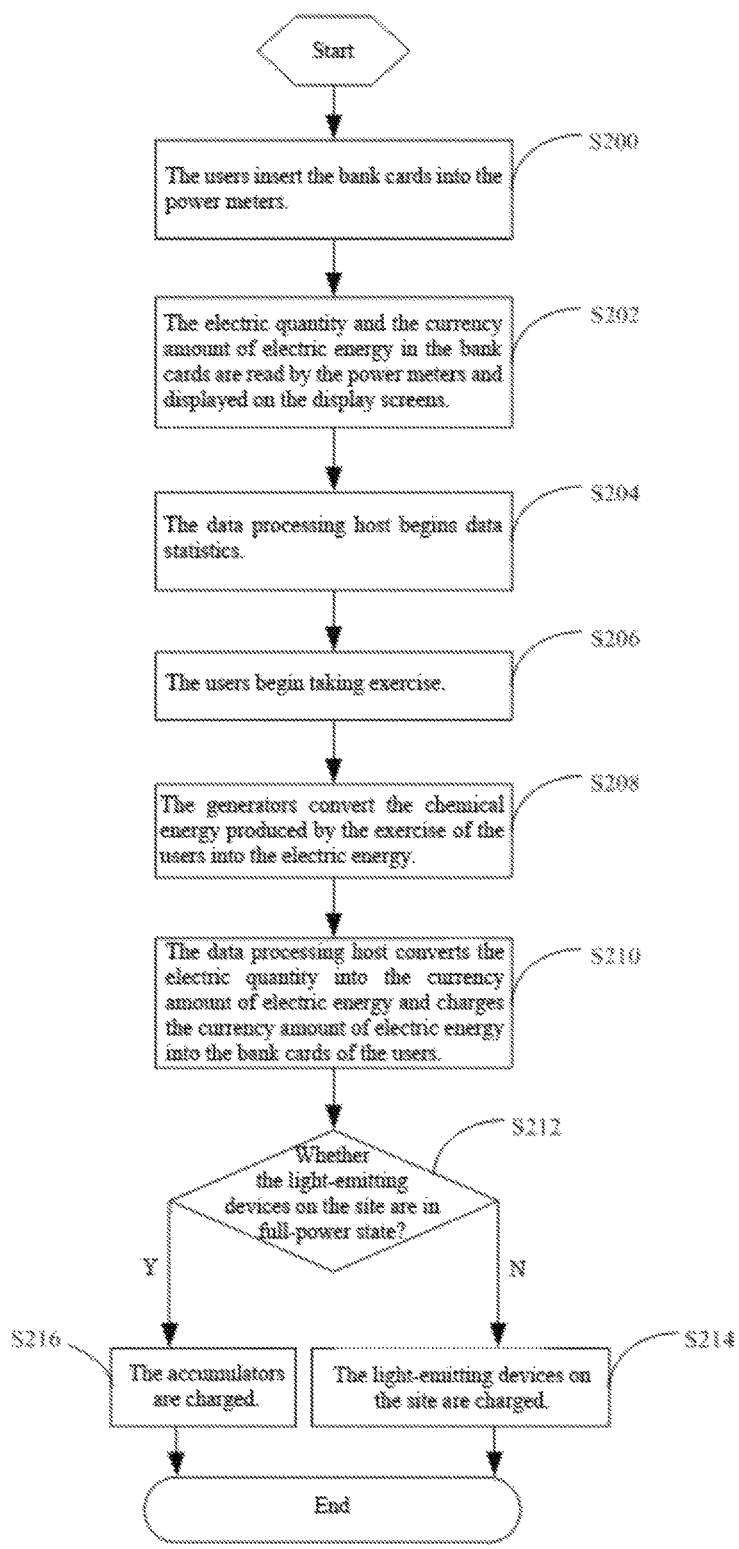
FIG. 7 is a flowchart of an energy on-site collection and measurement feedback method of the invention.

As illustrated in FIG. 7 which is a flowchart of the energy on-site collection and measurement feedback method, in step S200, the users insert the bank cards into the power meters 30.

In step S202, the electric quantity and the currency amount of electric energy in the bank cards are read by the power meters 30 and displayed on the display screens.

In step S204, the data processing host 60 begins data statistics.

In step S206, the users begin taking exercise.

In step S208, the generators 20 convert the chemical energy produced by the exercise of the users into the electric energy.

In step S210, the data processing host 60 converts the electric quantity into the currency amount of electric energy and charges the currency amount of electric energy into the bank cards of the users.

In step S212, the data processing host 60 determines whether the light-emitting devices on the site are in full-power state. If not, execute step S214, wherein the light-emitting devices on the site are charged. If so, execute step S216, wherein the accumulators 40 are charged.

The above content is further detailed description given to the invention with the attached specific preferred technical proposal. It should not be appreciated that the embodiments of the invention are only limited to the description. Moreover, it should be understood by those skilled in the art that various simple deductions or replacements may be made without departing from the concept of the invention and should be also within the scope of protection of the invention.

What is claimed is:

1. A system for energy collection and measurement, comprising:
   a plurality of fitness apparatuses, each apparatus producing mechanical energy,
   a plurality of generators, each connected to a respective fitness apparatus such that operation of the respective fitness apparatus induces the respective generator to produce electrical energy corresponding to the produced mechanical energy,
   a plurality of changeable energy storage accumulators connected with respective generators so as to selectively store electrical energy produced and include alarm systems providing a full-power alarm when a changeable energy storage accumulator is fully charged to indicate readiness for replacement,
   a plurality of power meters with display screens, each power meter connected between a respective generator and accumulator, to respectively measure and display an equivalent currency amount of the electrical energy produced,
   a plurality of two-step bank card readers, each connected with a respective power meter so as to first register an individual user and then, after an initial interval of at least five minutes, read and update data of a bank card associated with the individual user of a respective fitness apparatus and with the respective generator so as to sum a new equivalent currency amount to an existing currency balance of the individual user proportionate to an amount of electrical power produced by the respective generator during the individual's operation of the fitness apparatus at following intervals of one minute,
   chargeable light-emitting devices connected with the energy storage accumulators and switches controlling the operating state of each light emitting device,
   a data processing host in communication with all of the bank card readers, light-emitting devices, and power meters at an exercise site such that data of all of the power meters is transmitted to the data processing host and summarized and the data processing host can change passwords and inquire about power storage capacity of a given user and a corresponding currency amount thereof and wherein the electrical power produced is directed to charge the chargeable light-emitting devices until the light-emitting devices are fully charged and is then directed to charge the accumulators, and
   a keyboard connected with the data processing host.

2. The system of claim 1, wherein the fitness apparatuses include shoulder rehabilitation trainers, double-seat arm wheels, single-column double-seat rotating wheels, single-column riding machines, double-seat surfboard trainers, treadmills and exercycles.

3. The system of claim 1, wherein the generators are DC generators or AC generators; and the power meters are provided with display screens for data display.

4. A collection and measurement method of conversion of mechanical energy into electric energy storage comprising:
   connecting fitness apparatuses to associated generators;
   connecting power meters with display screens to associated generators so as to read and display an equivalent currency amount of electrical energy generated by the generators;
   connecting the power meters to associated changeable energy storage accumulators so as to selectively store electrical energy produced and wherein each changeable energy storage accumulator includes a full-power alarm indicating when a changeable energy storage accumulator is fully charged;
   replacing a given changeable energy storage accumulator when the associated full-power alarm indicates readiness for replacement of the given changeable energy storage accumulator;
   inserting individualized bank cards into two-step bank card readers of respective power meters so as to first register individual users;
   then, reading the power meters after an initial interval and displaying read information on the display screens thereof;
   converting mechanical energy produced by exercise of users of the fitness apparatuses into electric energy by the associated generators;
   converting the electric energy as read by the power meters into a corresponding currency amount and summing the converted currency amount to a pre-existing currency balance of the bank cards of the respective users only after the initial interval of electrical energy production of at least five minutes and, subsequently, at following intervals of one minute, wherein no new currency amount is summed to the existing currency balance of the individual user when the user fails to satisfy the initial interval;
   determining whether chargeable light-emitting devices indicate a full-power state, and if not, charging the light-emitting devices with the converted electrical energy; and if so, charging the accumulators with the converted electrical energy;
   inducing a data processing host to convert the produced electric energy into the corresponding currency amount and summing the corresponding currency amount to the currency balance of the bank cards of the respective users after the initial interval and at the following intervals, comprising the following steps of:
   connecting the data processing host with a plurality of the power meters, including a power meter 1, a power meter 2, . . . a power meter n;
   inducing the data processing host to read the data of the power meters in turn at the initial interval and at the following intervals;
   inducing the data processing host to convert the read electric energy into the corresponding currency amount; and inducing the data processing host to sum the corresponding currency amount to the currency balance of the bank cards of the users at the initial interval and at the following intervals.

\* \* \* \* \*